(12) United States Patent
Matsunaga et al.

(10) Patent No.: US 8,862,683 B2
(45) Date of Patent: Oct. 14, 2014

(54) KVM SWITCH AND KVM SYSTEM

(75) Inventors: Akihiro Matsunaga, Shinagawa (JP); Shinichi Katayama, Shinagawa (JP); Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 642 days.

(21) Appl. No.: 12/805,676

(22) Filed: Aug. 12, 2010

(65) Prior Publication Data

US 2011/0040853 A1    Feb. 17, 2011

(30) Foreign Application Priority Data

Aug. 17, 2009   (JP) ................................ 2009-188287

(51) Int. Cl.
*G06F 15/16*    (2006.01)
*G06F 3/023*    (2006.01)

(52) U.S. Cl.
CPC ..................................... *G06F 3/023* (2013.01)
USPC ........................................................ 709/208

(58) Field of Classification Search
USPC ........................................................ 709/208
See application file for complete search history.

(56) References Cited

U.S. PATENT DOCUMENTS

| 5,996,072 | A  | * | 11/1999 | Noll et al. ........................ 713/1 |
| 6,578,140 | B1 | * | 6/2003  | Policard ........................... 713/1 |
| 6,873,333 | B1 | * | 3/2005  | Patel et al. ..................... 345/530 |
| 7,174,465 | B2 | * | 2/2007  | Freeman et al. ............... 713/191 |
| 7,386,359 | B2 | * | 6/2008  | Dohle et al. ................... 700/104 |
| 7,426,542 | B2 | * | 9/2008  | Rothman et al. .............. 709/208 |
| 7,454,490 | B2 | * | 11/2008 | Sivertsen ....................... 709/223 |
| 7,478,152 | B2 | * | 1/2009  | Holt et al. ...................... 709/223 |
| 7,478,182 | B2 | * | 1/2009  | Schweig .......................... 710/73 |
| 7,606,314 | B2 | * | 10/2009 | Coleman et al. ......... 375/240.27 |
| 7,684,483 | B2 | * | 3/2010  | Coleman ................. 375/240.01 |
| 7,792,914 | B2 | * | 9/2010  | Huang ........................... 709/208 |
| 7,818,367 | B2 | * | 10/2010 | Beasley et al. ................ 709/203 |
| 7,818,480 | B2 | * | 10/2010 | Hoerl et al. ..................... 710/62 |
| 7,853,663 | B2 | * | 12/2010 | Hoerl et al. .................... 709/208 |
| 7,917,674 | B2 | * | 3/2011  | Lin et al. ......................... 710/73 |
| 7,930,447 | B2 | * | 4/2011  | Best et al. ....................... 710/33 |
| 8,015,332 | B2 | * | 9/2011  | Kobayashi ...................... 710/62 |
| 8,028,108 | B2 | * | 9/2011  | Batish et al. .................... 710/72 |
| 8,176,155 | B2 | * | 5/2012  | Yang et al. .................... 709/223 |
| 8,209,438 | B2 | * | 6/2012  | Bauch et al. .................. 709/250 |
| 8,244,824 | B2 | * | 8/2012  | Garibaldi et al. ............. 709/208 |

(Continued)

FOREIGN PATENT DOCUMENTS

| JP | 2001-325171 | 11/2001 |
| JP | 2004-302720 | 10/2004 |

OTHER PUBLICATIONS

Patent Abstracts of Japan, Publication No. 2001-325171, Published Nov. 22, 2001.

(Continued)

*Primary Examiner* — Alicia Baturay
(74) *Attorney, Agent, or Firm* — Staas & Halsey LLP

(57) ABSTRACT

A KVM switch connected between an information processing device and a remote terminal, includes a memory part that stores boot screen data generated when the information processing device is booted or rebooted, and a transmission control part configured to send predetermined key data to the information processing device independently of the remote terminal when screen data received from the information processing device coincides with the boot screen data stored in the memory part.

12 Claims, 13 Drawing Sheets

(56) References Cited

U.S. PATENT DOCUMENTS

| | | | |
|---|---|---|---|
| 2003/0084133 A1* | 5/2003 | Chan et al. | 709/222 |
| 2003/0088655 A1* | 5/2003 | Leigh et al. | 709/223 |
| 2005/0044184 A1* | 2/2005 | Thomas et al. | 709/219 |
| 2007/0208891 A1* | 9/2007 | Liu | 710/62 |
| 2009/0013109 A1* | 1/2009 | Schweig | 710/72 |
| 2009/0031417 A1* | 1/2009 | Horikawa | 726/17 |
| 2009/0055157 A1* | 2/2009 | Soffer | 703/27 |
| 2009/0144479 A1* | 6/2009 | Cui et al. | 710/316 |
| 2010/0070743 A1* | 3/2010 | Grigor et al. | 713/1 |
| 2011/0016297 A1* | 1/2011 | Merizan et al. | 713/1 |
| 2011/0093555 A1* | 4/2011 | Dary et al. | 709/208 |

OTHER PUBLICATIONS

Patent Abstracts of Japan, Publication No. 2004-302720, Published Oct. 28, 2004.

* cited by examiner ly by the client PCs. This is because data communications take place between the servers and the client PCs via the network and there is a time lag in data transmission. Thus, there may be a case where, when a key is operated to boot BIOS of the servers at the client PCs, the BIOS boot screen of the servers has already been complete and a next screen has been displayed.

KVM SWITCH AND KVM SYSTEM

CROSS-REFERENCE TO RELATED APPLICATION

This application is based upon and claims the benefit of priority of the prior Japanese Patent Application No. 2009-188287, filed on Aug. 17, 2009, the entire contents of which are incorporated herein by reference.

FIELD

A certain aspect of the embodiments discussed herein is related to a KVM switch and a KVM system.

BACKGROUND

There is known a KVM switch provided between servers and client PCs such as personal computers. The term "KVM" is an abbreviation for keyboard, video and mouse. The KVM switch selectively connects the servers and the client personal computers (client PCs) to allow KVM data signals to be transferred between the servers and the selected client PC. The KVM switch and the client PCs may be connected via a network so that the servers connected to the KVM switch can be controlled remotely.

In a case where the servers and the client PCs are connected via a network, the BIOS (Basic Input/Output System) of the client PCs may be set up by the servers (see Japanese Patent Application Publication No. 2001-325171).

In the computers, screen output information such as BIOS boot information is stored in a memory and is used to analyze a failure that takes place when the client PCs are booted (see Japanese Patent Application Publication No. 2004-302720).

Generally, the boot screen is displayed for a short time in booting the personal computers. In the KVM system that uses a KVM switch for selectively connecting the servers and the client PCs, booting of BIOS of the servers may not be achieved by the client PCs. This is because data communications take place between the servers and the client PCs via the network and there is a time lag in data transmission. Thus, there may be a case where, when a key is operated to boot BIOS of the servers at the client PCs, the BIOS boot screen of the servers has already been complete and a next screen has been displayed.

In such a case, the servers may be booted repeatedly until booting of BIOS is completed. This work is troublesome.

SUMMARY

According to an aspect of the present invention, there is provided a KVM switch connected between an information processing device and a remote terminal, including: a memory part that stores boot screen data generated when the information processing device is booted or rebooted; and a transmission control part configured to send predetermined key data to the information processing device independently of the remote terminal when screen data received from the information processing device coincides with the boot screen data stored in the memory part.

DESCRIPTION OF EMBODIMENTS

Figure 1:
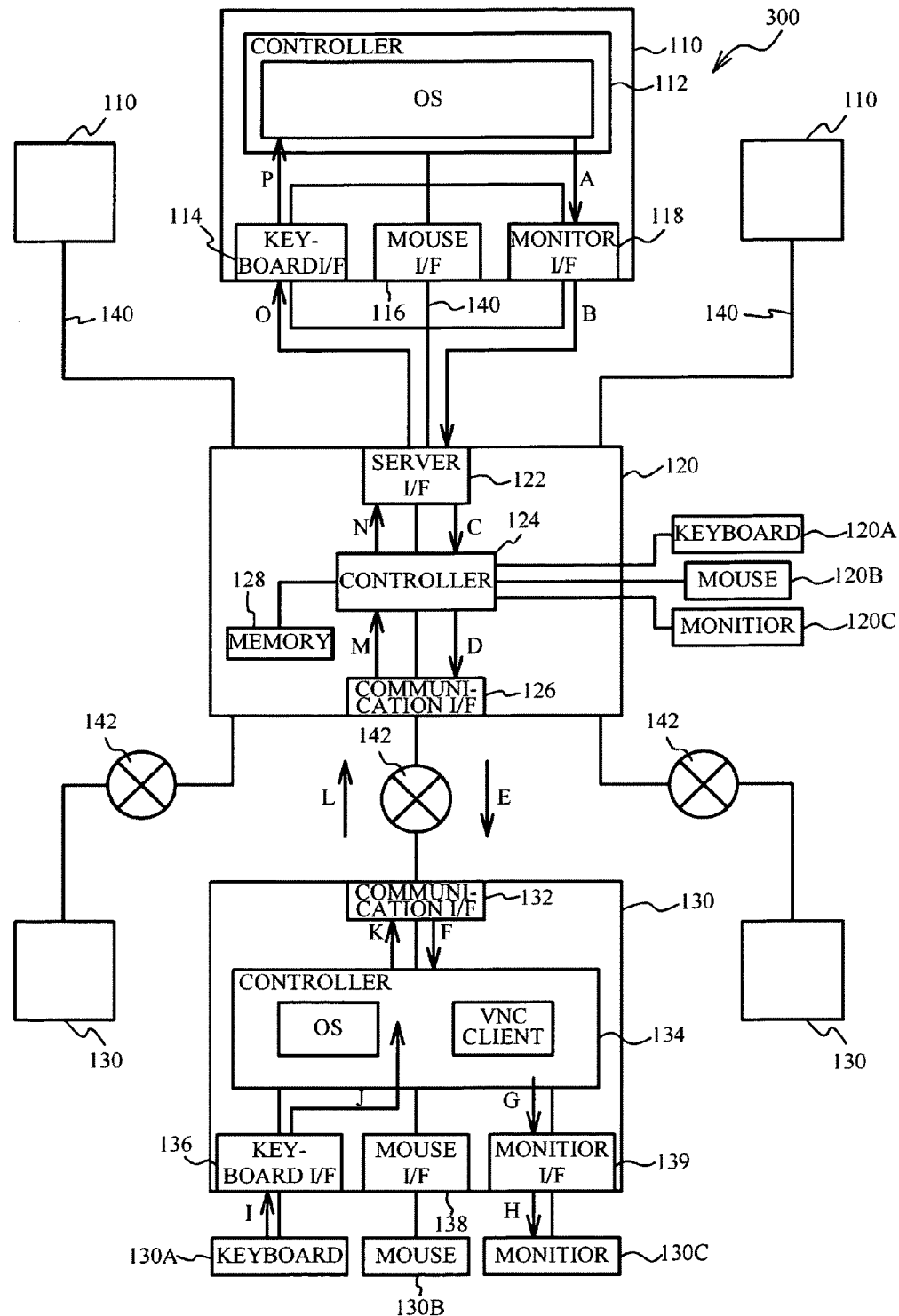
FIG. 1 is a block diagram of a KVM system in accordance with a comparative example.

Now, a description will be given of problems to be solved according to an aspect of an embodiment by referring to an exemplary case where BIOS of a server is booted by a remote operation on a client PC via a network. FIG. 1 is a block of a KVM system 300 in accordance with a comparative example.

Referring to FIG. 1, the KVM system 300 has servers 110, a KVM switch 120 and client PCs 130. The servers 110 are information processing devices, and the client PCs 130 are remote terminals. A keyboard 120A, a mouse 120B and a monitor 120C are connected to the KVM switch 120. A keyboard 130A, a mouse 130B and a monitor 130C are connected to each of the client PCs 130. The comparative example is not limited to the illustrated configuration composed of the three servers 110 and the three client PCs 130, but may be configured to have an arbitrary number of servers 110 and an arbitrary number of client PCs 130, which are selectively connectable via the KVM switch 120.

Each of the servers 110 has a controller 112, a keyboard interface (I/F) 114, a mouse interface 116, and a monitor interface 118. For the sake of simplicity, only one of the servers 110 is illustrated in detail in FIG. 1 and the following description is mainly directed to this server 110 located at the center.

The KVM switch 120 is equipped with a server interface 122, a controller 124, a communication interface 126, and a memory 128. The server interface 122 is connected, via KVM cables 140, to the keyboard interfaces 114, the mouse interfaces 116 and the monitor interfaces 118 of the servers 110. The communication interface 126 is connected to communication interfaces 132 of the client PCs 130 via a network 142. The controller 124 obtains key data and mouse data from IP packet data received from the client PCs 130, and selects one of the servers 110 that is to be connected to the client PC 130 that transmits the above key data and mouse data. Then, the controller 124 connects the client PC 130 to the selected server 110. The controller 124 converts video data received from the server 110 into IP packet data, and sends the IP packet data to the involved client PC 130. The controller 124 obtained from the key data and the mouse data from the IP packet data received from the involved client PC 130, and sends the key data and mouse data to the involved server 110. The memory 128 stores a control program that describes an operation of the controller 124.

The client PC 130 is equipped with the communication interface 132, a controller 134, a keyboard interface 136, a mouse interface 138, and a monitor interface 139. The controller 134 has an operating system (OS) and a virtual network computing client. The controller 134 converts video data, key data and mouse data into IP packet data and vice versa. The keyboard interface 136, the mouse interface 138 and the monitor interface 139 are respectively connected to the keyboard 130A, the mouse 130B and the monitor 130C. The three client PCs 130 have the same configuration, and only one of the client PCs 130 is illustrated in detail in FIG. 1. The following description is mainly directed to this client PC 130 located at the center for the sake of convenience.

Video data of RGB signals generated by the servers 110 are sent to the KVM switch 120 via the KVM cables 140 in the form of the RGB signals, and are converted into IP packet data at the KVM switch 120. The IP packet data is sent to the client PCs 130 via the network 142, and obtains, from the IP packet data, video data of the RGB signals having the same format as that of the RGB signals generated at the servers 110. The key data and the mouse data respectively input by the keyboard 130A and the mouse 130B are converted into IP packet data by the corresponding client PC 130. The IP packet data thus generated is sent to the KVM switch 120 via the network 142. The key data and the mouse data are obtained from the received IP packet data at the KVM switch 120, and are sent to the corresponding server 110 via the KVM cable 140. The user operates the server 110 by the client PC 130 as if the client PC 130 is directly connected to the server 110.

Figure 2A:
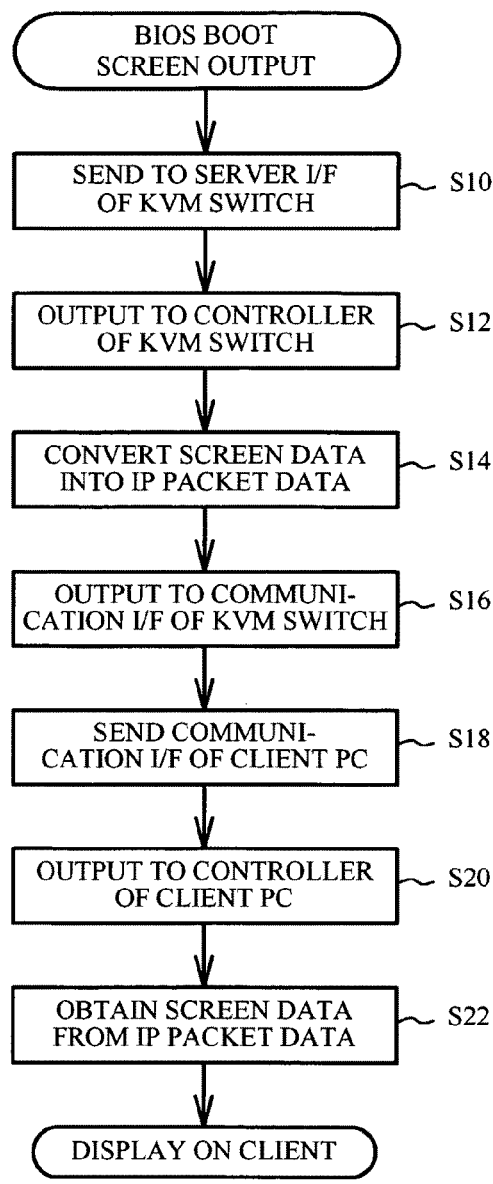
FIG. 2A is a flowchart of a flow of data from a server to a client PC.

FIG. 2A is a flowchart of a flow of BIOS boot screen data until a BIOS boot screen is displayed at the client PC 130 after the BIOS boot screen data is generated at the server 110.

Figure 2B:
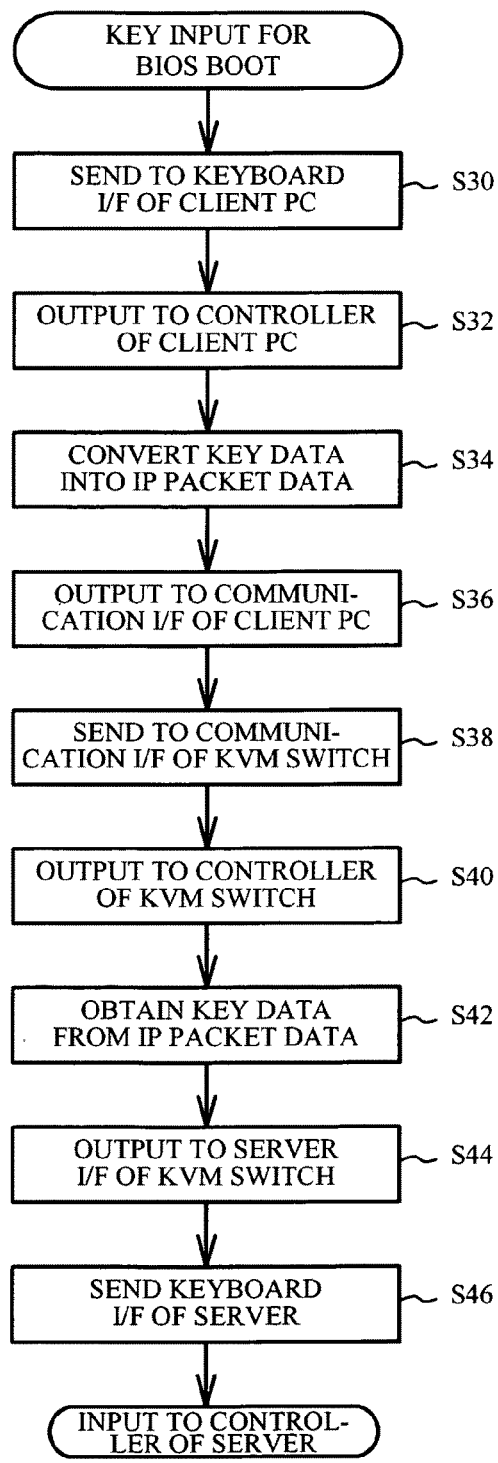
FIG. 2B is a flowchart of data from a client PC and a server.

FIG. 2B is a flowchart of a flow of BIOS boot key data until BIOS boot key data is input to the server 110 after the BIOS boot key data is generated by the client PC 130.

A description will now be given, with reference to FIGS. 1 and 2A, of the flow of BIOS boot screen data until the BIOS boot screen data is sent to the client PC 130 after it is generated by the server 110. Referring to FIGS. 1 and 2A, BIOS boot screen data is generated when the server 110 is booted or rebooted, and is output to the monitor interface 118 of the server 110, as indicated by an arrow A. Then, the BIOS boot screen data is sent to the server interface 122 of the KVM switch 120 via the KVM cable 140 as indicated by an arrow B (step S10).

The BIOS boot screen data sent to the server interface 122 is output to the controller 124, as indicated by an arrow C (step S12). Then, the controller 124 converts the BIOS boot screen data into IP packet data (step S14). The IP packet data is output to the communication interface 126, as indicated by an arrow D (step S16), and is then sent to the communication interface 132 of the client PC 130 via the network 142, as indicated by an arrow E (step S18).

The IP packet data sent to the communication interface 132 is output to the controller 134, as indicated by an arrow F (step S20). The controller 134 extracts the BIOS boot screen data from the IP packet data (step S22). The virtual network computing client of the controller 134 sends the BIOS boot screen data to the monitor 130C, as indicated by arrows G and H. The BIOS boot screen is displayed on the monitor 130C.

The BIOS boot screen is displayed on the client PC 130 through the above-described flow of the BIOS boot screen data.

A description will now be given, with reference to FIGS. 1 and 2B, of a flow of BIOS boot key data until BIOS boot key is input to the server 110 after the BIOS boot key is input through the keyboard 130A of the client PC 130 on the basis of the BIOS boot screen displayed on the client PC 130. When a given key of the keyboard 130A for booting BIOS is operated on the basis of the BIOS boot screen displayed on the monitor 130C, the BIOS boot key data is sent to the keyboard interface 136 as indicated by an arrow I (step S30).

The BIOS boot key data sent to the keyboard interface 136 is output to the controller 134, as indicated by an arrow J (step S32), and is converted into IP packet data by the controller 134 (step S34). The IP packet data is output to the communication interface 132 as indicated by an arrow K (step S36), and is sent to the communication interface 126 via the network 142, as indicated by an arrow L (step S38).

The IP packet data sent to the communication interface 126 is output to the controller 124 as indicated by an arrow M (step S40). The controller 124 obtains the BIOS boot key data from the IP packet data (step S42). The BIOS boot key data is output to the server interface 122, as indicated by an arrow N (step S44), and is sent to the keyboard interface 114 of the server 110 via the KVM cable 140, as indicated by an arrow O (step S46).

The BIOS boot key data sent to the keyboard interface 114 is output to the controller 112, as indicated by an arrow P, and the inputting of the BIOS boot key data is complete.

As described above, BIOS of the server 110 may be booted by the remote operation at the client PC 130. However, since the BIOS boot screen data is converted into IP packet data and is then sent to the client PC 130 via the network 142, a time lag occurs until the BIOS boot screen is displayed on the client PC 130 after the BIOS boot screen data is generated at the server 110. Further, another time lag takes place until BIOS boot key data is input to the server after the BIOS boot key data is generated by the key operation at the client PC 130, because the BIOS boot key data generated by the key operation is converted into IP packet data and is then sent to the server 110 via the network 142. That is, in the case where the BIOS of the server 110 is booted by the remote operation via the network 142, a time lag occurs since the BIOS boot key data is input to the server 110 after the BIOS boot screen data is generated at the server 110.

Generally, the BIOS boot screen is displayed for a short time. Thus, if there is a time lag until BIOS boot key data is input after the BIOS boot screen data is generated at the server 110, BIOS may not be booted. According to an aspect of embodiments described blow, the above problem is solved.

Figure 3:
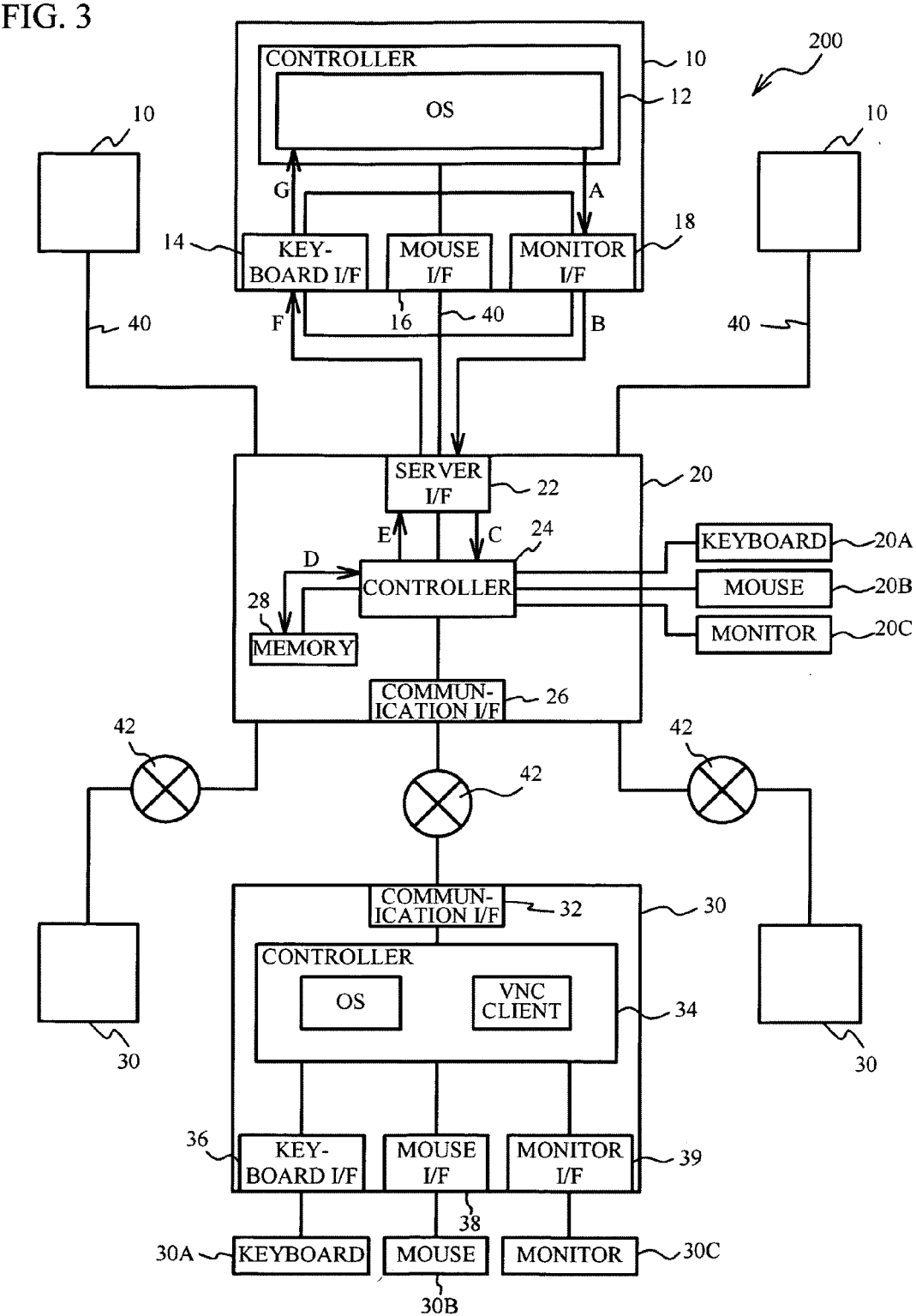
FIG. 3 is a block diagram of a KVM system including a KVM switch in accordance with a first embodiment.

FIG. 3 is a block diagram of a KVM system including a KVM switch 20 in accordance with a first embodiment. Referring to FIG. 3, the KVM system 200 is equipped with servers 10, the KVM switch 20, and client PCs 30. The servers 10 are information processing devices, and the client PCs 30 are remote terminals. The KVM switch 20 includes a server interface 22, a controller 24, a communication interface 26 and a memory 28. A keyboard 20A, a mouse 20B and a monitor 20C are connected to the controller 24. Each server 10 has a controller 12, a keyboard interface 14, a mouse interface 16, and a monitor interface 18. The servers 10 are connected to the KVM switch 20 via cables 40. Each client PC 30 has a communication interface 32, a controller 34, a keyboard interface 36, a mouse interface 38, and a monitor interface 39. A keyboard 30A, a mouse 30B and a monitor 30C are respectively connected to the interfaces 36, 38 and 39. The client PCs 30 are connected to the KVM switch 20 via respective networks 42.

Figure 4:
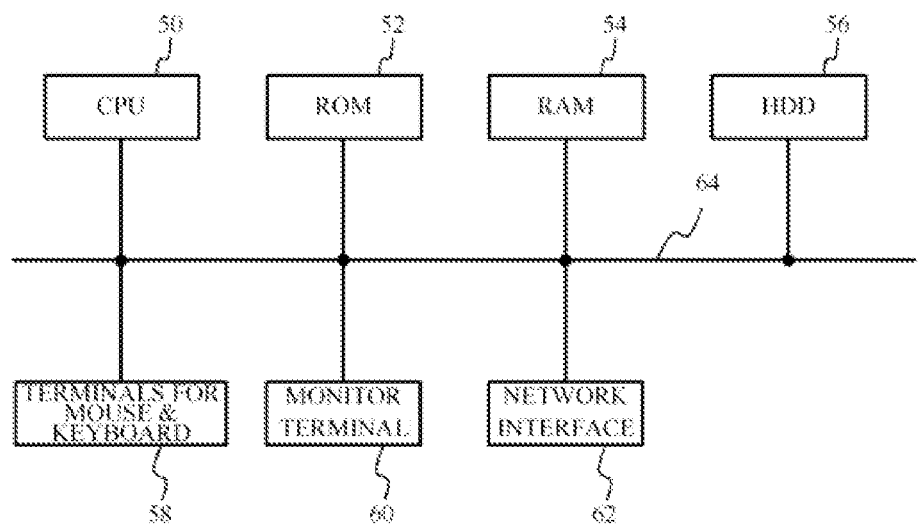
FIG. 4 is a block diagram of a hardware structure of the KVM switch configured according to the first embodiment.

FIG. 4 is a block diagram of a hardware structure of the KVM switch 20 in accordance with the first embodiment. Referring to FIG. 4, the KVM switch 20 has a CPU 50, a ROM 52, a RAM 54, and a hard disk drive (HDD) 56, a mouse/keyboard terminal 58, a monitor terminal 60, and a network interface 62. The CPU 50 controls the whole KVM switch 20. The ROM 52 stores a control program executed by the CPU 50. The RAM 54 may function as a working area for the CPU 50. The HDD 56 stores BIOS boot screen data and BIOS boot key data. The mouse/keyboard terminal 58 is used to connect the mouse 20B and the keyboard 20A. The monitor terminal 60 is used to connect the monitor 20C. The CPU 50 is connected, via a system bus 64, to the ROM 52, the RAM 54, the HDD 56, the mouse/keyboard terminal 58, the monitor terminal 60 and the network interface 62.

The controller 24 illustrated in FIG. 3 corresponds to the CPU 50 that executes various processes in accordance with the control program. The server interface 22 and the communication interface 26 correspond to the network interface 62. The memory 28 corresponds to the ROM 52, the RAM 54 and the HDD 56.

Figure 5:
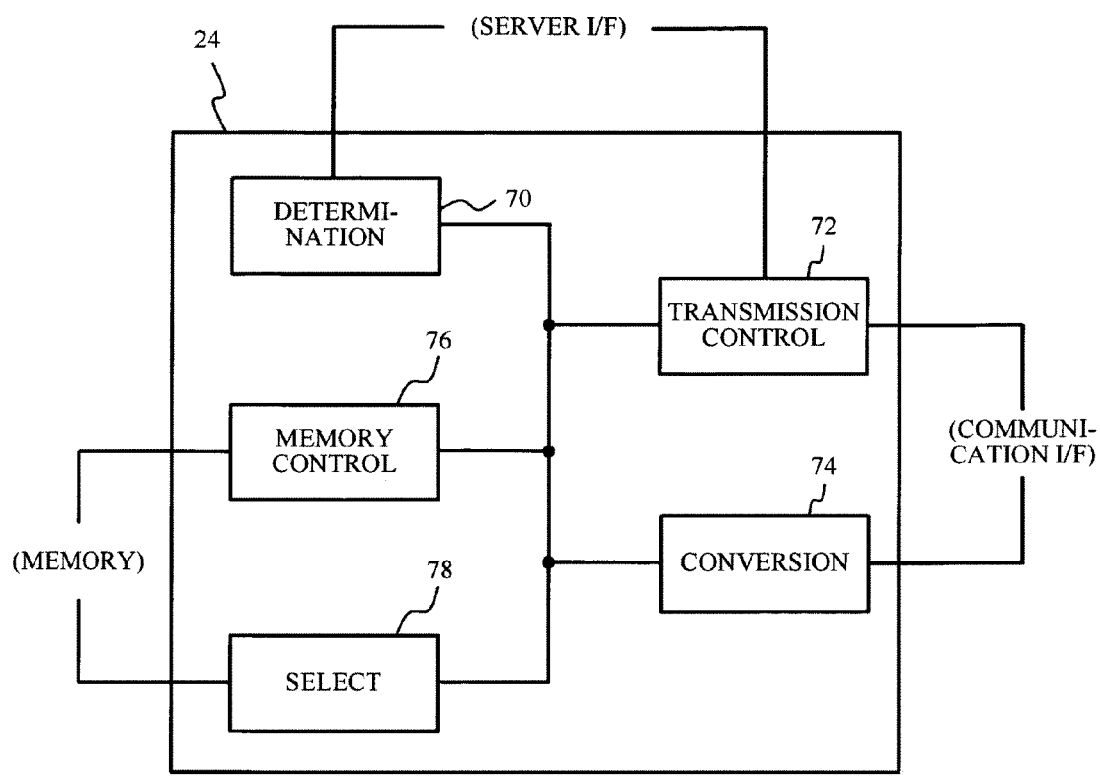
FIG. 5 is a block diagram of a functional structure of a controller of the KVM switch employed in the first embodiment.

FIG. 5 is a block diagram that illustrates functions realized by the cooperation of the hardware of the CPU 50 and the software stored in the ROM 52 in the controller 24 of the KVM switch 20.

As illustrated in FIG. 5, the controller 24 has a determination part 70, a transmission control part 72, a conversion part 74, a memory control part 76, and a select part 78.

The determination part 70 determines whether the automatic BIOS boot function is valid. When the automatic BIOS boot function is valid, the determination part 70 determines whether screen data sent by the server 10 coincides with one of multiple pieces of BIOS boot data stored in the memory 28 selected by the select part 78.

The transmit control part 72 controls data transmission. For example, when the determination part 70 determines that the screen data from the server 10 coincides with the selected one of the pieces of BIOS boot screen data from the select part 78, the transmission control part 72 sends data converted by the conversion part 74 to the server 10 or the client PC 30.

Figure 6:
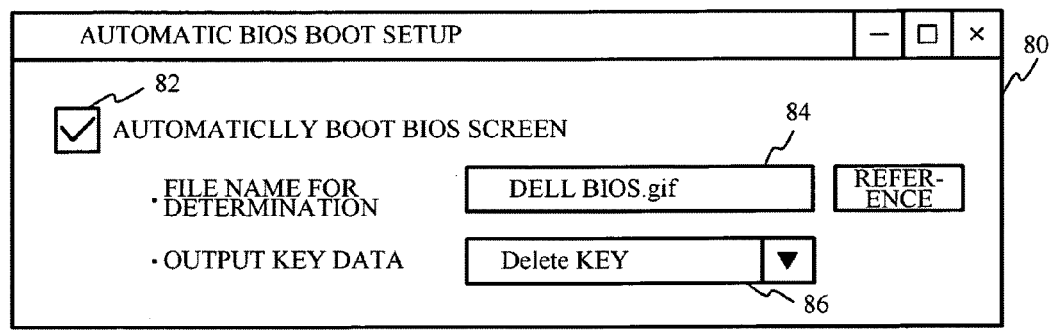
FIG. 6 illustrates an automatic BIOS boot setup screen displayed on a client PC.

Now, the details of BIOS booting are described. FIG. 6 illustrates an exemplary automatic BIOS boot setup screen displayed on the client PCs 30. Referring to FIG. 6, an automatic BIOS boot setup screen 80 has a check box 82, and select boxes 84 and 86. The check box 82 is used to specify whether the automatic BIOS boot function should be valid. The box 84 is used to specify a file name to be determined. The box 86 is used to specify output key data. The user may set up the BIOS boot screen data and the validity of the automatic BIOS boot function on the automatic BIOS boot setup screen 80.

In a case where the check box 82 used to automatically boot the BIOS screen is selected, the automatic BIOS boot function is validated. Thus, the determination part 70 determines whether the check box 82 has been selected in order to determine whether the automatic BIOS boot function is valid.

The file name to be determined is the file name of a piece of BIOS boot screen data stored in the memory 28. A piece (file) of BIOS boot screen data may be selected from among the pieces (files) of BIOS boot screen data stored in the memory 28. The determination part 70 determines whether the BIOS boot screen data selected using the select box 84 coincides with the screen data sent by the server 10.

The output key data is BIOS boot key data sent to the server 10 in the case where the determination part 70 determines that the screen data from the server 10 coincides with the BIOS boot screen data selected in the select box 84. The memory 28 stores multiple pieces of BIOS boot key data, and the select part 78 selects one of the multiple pieces of BIOS boot key data. Thus, the transmission control part 72 sends the selected BIOS boot key data specified on the select box 86 for output key data in the case where it is determined that the screen data from the server 10 coincides with the BIOS boot screen data selected on the select box 84.

The setup of the automatic BIOS boot is carried out when the server 10 is shut down or rebooted. At the time of booting or rebooting the server 10, the automatic BIOS boot is performed on the basis of the information that is entered on the automatic BIOS boot setup screen 80.

The conversion part 74 converts screen data and key data into IP packet and vice versa. For example, when the determination part 70 determines that the screen data from the server 10 does not coincide with the BIOS boot screen data selected by the select part 78, the conversion part 74 converts the screen data from the server 10 into IP packet data. The conversion part 74 converts the IP packet data received via the communication interface 26 from the client PC 30 into key data.

The memory control part 76 stores screen data that is captured and send by the client PC 30 among the screens displayed on the client PC 30.

The select part 78 selects one piece of BIOS boot screen data from among the multiple pieces of BIOS boot screen data stored in the memory 28. The select part 78 selects one piece of BIOS boot key data from among the multiple pieces of BIOS boot key data stored in the memory 28. One piece of BIOS boot screen data and one piece of BIOS boot key data may be selected by the aforementioned method illustrated in FIG. 6.

Figure 7:
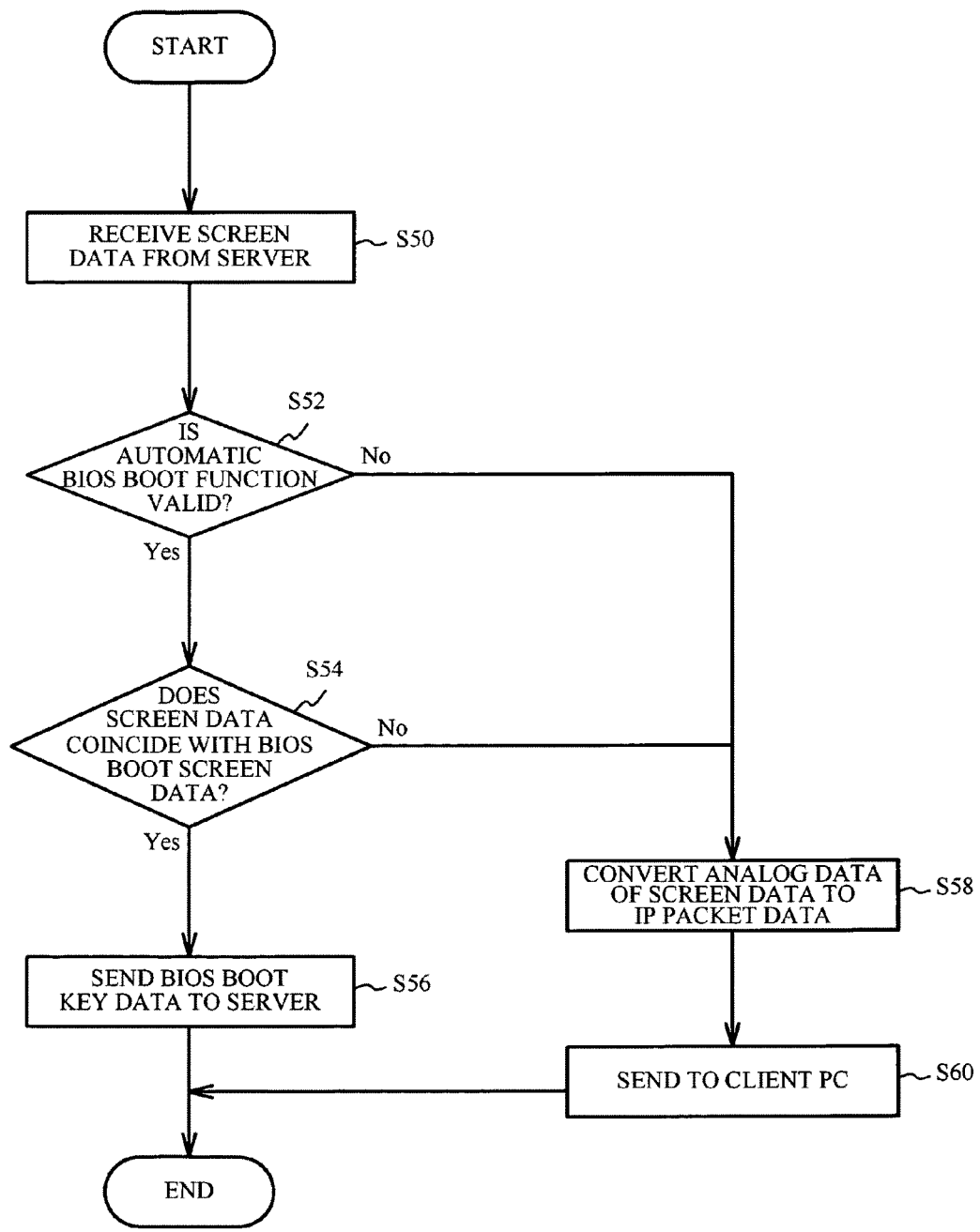
FIG. 7 is a flowchart of a process executed in the KVM switch of the first embodiment.

A description will now be given, with reference to a flowchart of FIG. 7, of a process executed by the controller 24 of the KVM switch 20. Referring to FIG. 7, when the server 10 is booted or rebooted, the controller 24 receives screen data generated in the server 10 via the monitor interface 18, the cable 40 and the server interface 22, as indicated by the arrows A, B and C in FIG. 3 (step S50). The controller 24 determines whether the automatic BIOS boot function is valid (step S52). When it is determined that the automatic BIOS boot function is valid (YES in step S52), the controller 24 determines whether the screen data received from the server 10 coincides with the BIOS boot screen data selected from among the multiple pieces of BIOS boot screen data stored in the memory 28 (step S54).

When it is determined that the screen data received from the server 10 coincides with the BIOS boot screen data selected from among the multiple pieces of BIOS boot screen data stored in the memory 28 (YES in step S54). The controller 24 sends one piece of BIOS boot key data selected from among the multiple pieces of BIOS boot key data stored in the memory 28 to the controller 12 of the server 10 via the server interface 22, the cable 40 and the keyboard interface 14 as indicated by the arrows D, E, F and G (step S56).

When the answer of step S54 is NO, the controller 24 converts the screen data into IP packet data (step S58), and sends it to the client PC 30 via the communication interface 26 and the network 42 (step S60).

As described above, according to the KVM switch 20 of the first embodiment, the memory 28 stores the BIOS boot screen data of the server 10. When the screen data received from the server 10 coincides with the BIOS boot screen data stored in the memory 28, the BIOS boot key data stored in the memory 28 is sent to the server 10. Thus, the BIOS boot of the server 10 may be controlled automatically by the KVM switch 20. That is, no data is transferred between the server 10 and the client PC 30 via the network 42 when BIOS of the server 10 is booted. It is thus possible to reduce the time lag until the BIOS boot key data is input to the server 10 after the BIOS boot screen is generated in the server 10 and to more reliably boot BIOS of the server 10.

The memory 28 stores the multiple pieces of BIOS boot screen data and the multiple pieces of BIOS boot key data. One of the multiple pieces of BIOS boot screen data and one of the multiple pieces of BIOS boot key data are selected. When the screen data received from the server 10 coincides with the selected BIOS boot screen data, the selected BIOS boot key data is sent to the server 10. Thus, even when the multiple servers 10 with the different operating systems are connected to the KVM switch 20, the KVM switch 20 may automatically handle the BIOS boots of the servers 10.

Figure 8:
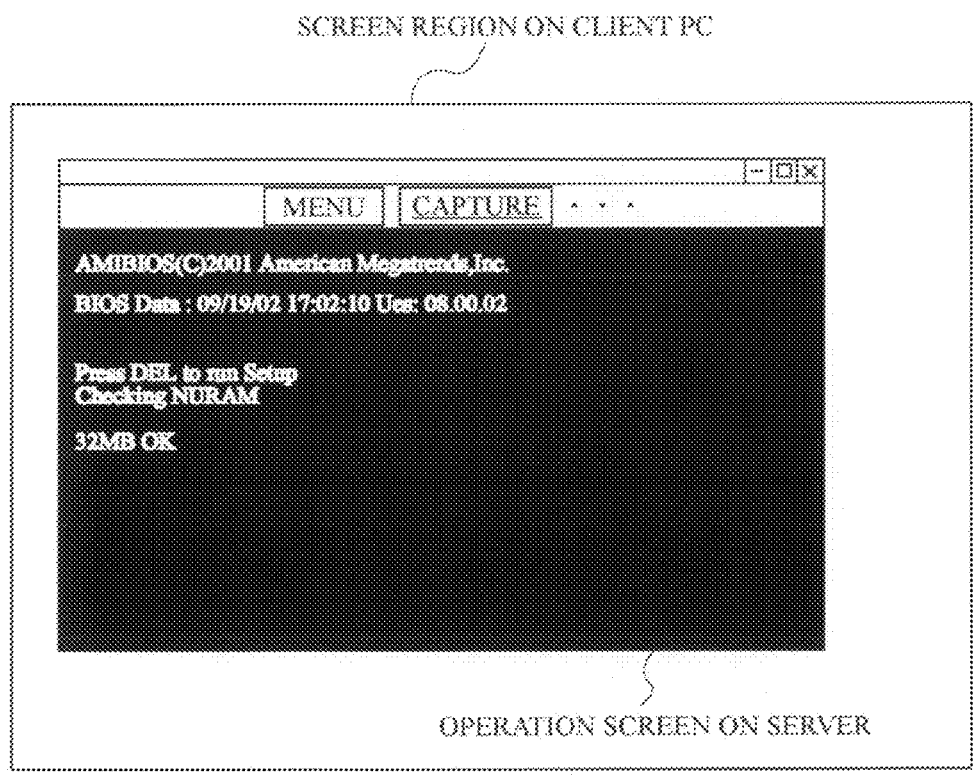
FIG. 8 illustrates an operation screen of a server displayed on a client PC in which the operation screen includes a BIOS boot screen.
Figure 9:
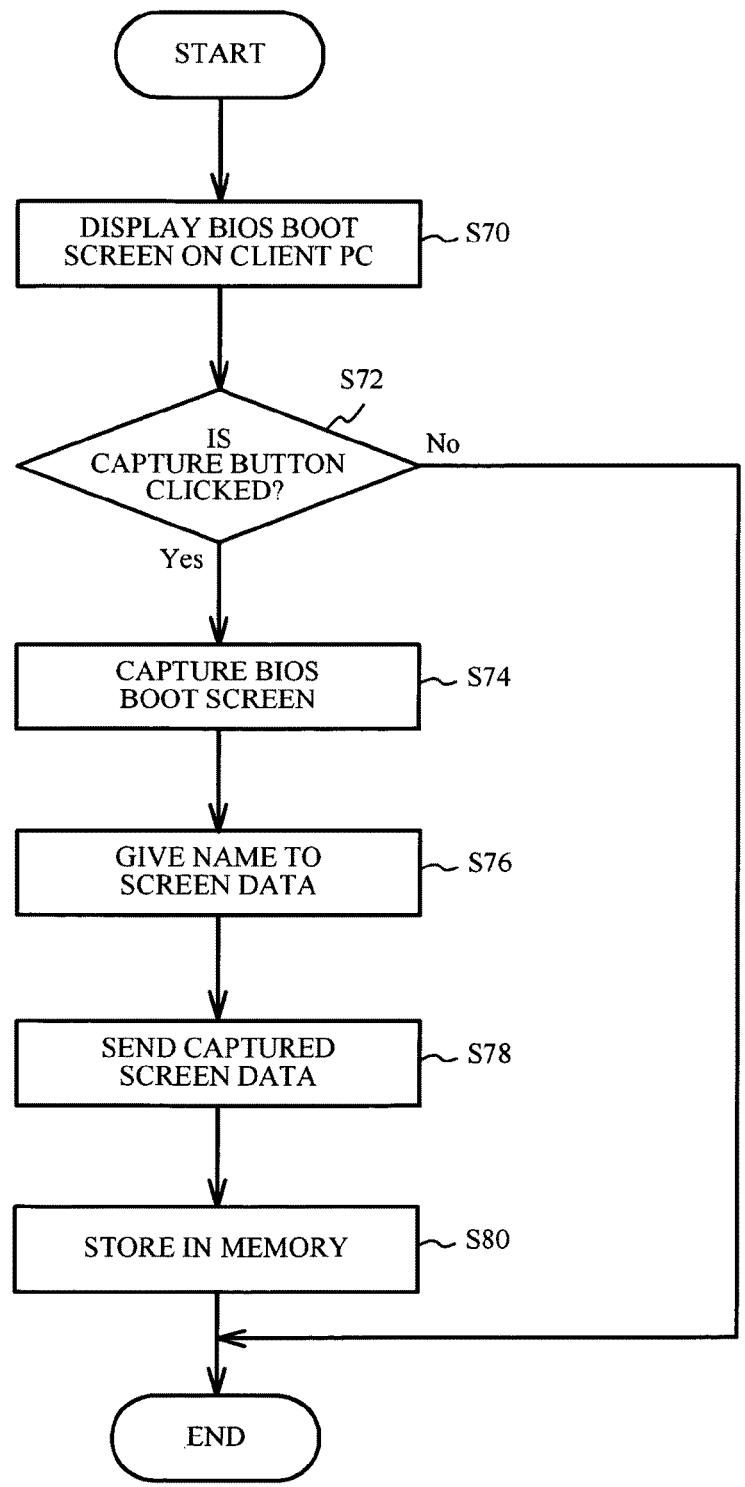
FIG. 9 is a flowchart of a method for storing BIOS boot screen data in a memory part.

A description will now be given, with reference to FIGS. 8 and 9, of a method for storing BIOS boot screen data in the memory 28. FIG. 8 illustrates an operation screen of the server that includes the BIOS boot screen displayed on the client PC 30. FIG. 9 is a flowchart of a method for storing the BIOS boot screen data in the memory 28.

Referring to FIG. 8, in order to capture the BIOS boot screen displayed on the client PC 30, a capture button may be provided on the server operation screen. In order to omit a mouse operation of clicking the capture button, a hot key for executing the capture operation may be provided.

As illustrated in FIG. 9, the controller 34 of the client PC 30 displays the server operation screen including the BIOS boot screen on the client PC 30 on the basis of the screen data sent by the server 10 via the KVM switch 20 (step S70). As illustrated in FIG. 8, the capture button is provided on the server operation screen. When the capture button is clicked by the mouse 30B connected to the client PC 30 (YES in step S72), the controller 34 of the client PC 30 captures the BIOS boot screen displayed on the client PC 30 (step S74). The controller of the client PC 30 gives a name to the captured screen data on the basis of the key data input through the keyboard 30A (step S76). Then, the controller 34 of the client PC 30 sends the captured screen data to the KVM switch 20 (step S78). The controller 24 of the KVM switch 20 stores the captured screen data in the memory 28 in an appropriate format, which may, for example, GIF data format (step S80).

As described above, the KVM switch 20 receives the screen data captured from among the screens displayed on the client PC 30, and stores the captured screen data in the memory 28. It is thus possible to store new BIOS boot screen in the memory 28 even when the server 10 with a new operating system is connected or even when the BIOS boot screen is changed or added.

Figure 10:
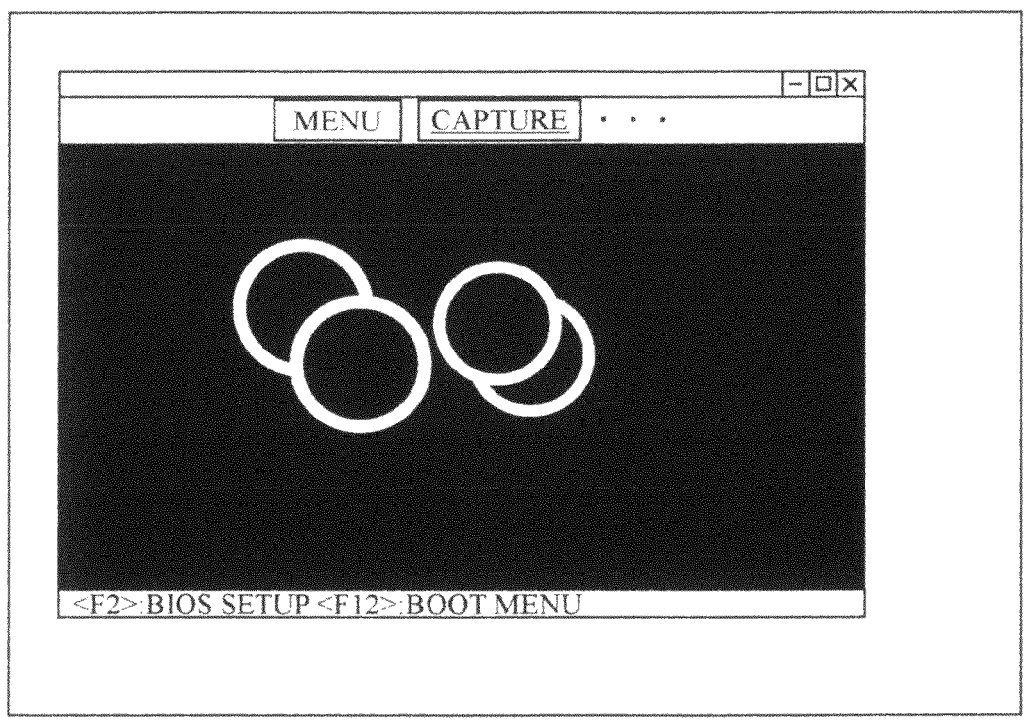
FIG. 10 illustrates an exemplary server boot screen.

In the above-described first embodiment, the boot screen generated when the server 10 is booted or rebooted is the BIOS boot screen. However, the present embodiment is not limited to the BIOS boot screen but may employ another boot screen. In a case where a boot screen as illustrated in FIG. 10 is generated when the server 10 is booted or rebooted, a boot menu may be activated by selecting an F12 key to generate boot menu key data in addition to booting of BIOS through an F2 key to generate BIOS boot key data in the select box 84 for selecting output key data on the automatic BIOS boot setup screen 80 illustrated in FIG. 6.

A second embodiment will now be described. A KVM system configured according to the second embodiment includes the KVM switch 20 and has the same block diagram as that of the first embodiment. A block diagram of a hardware structure of the KVM switch employed in the second embodiment is the same as that of the first embodiment illustrated in FIG. 4.

Figure 11:
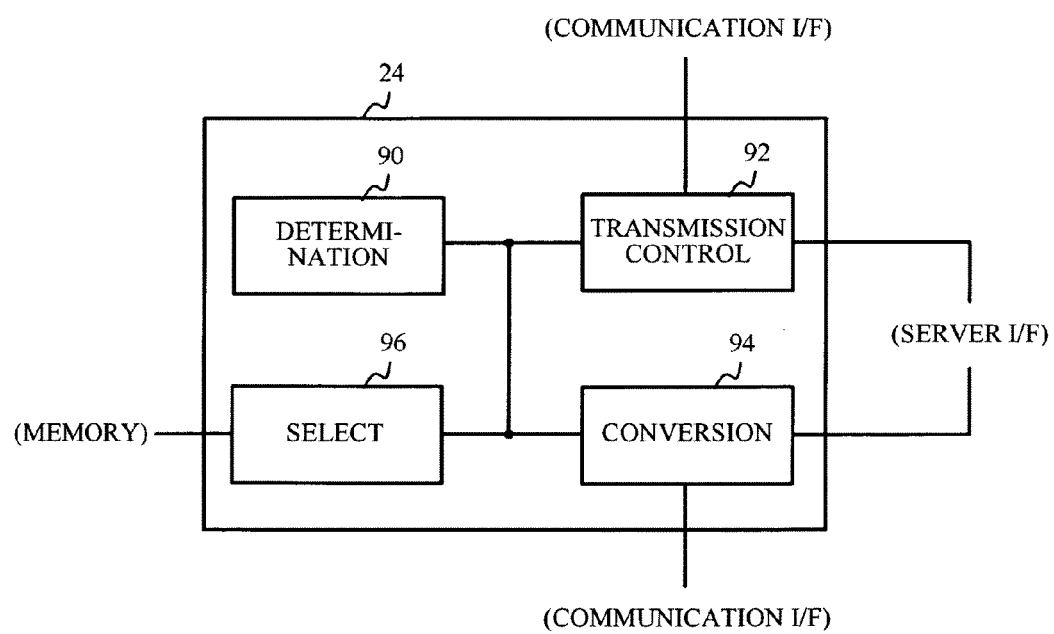
FIG. 11 is a block diagram of a functional structure of a controller of a KVM switch in accordance with a second embodiment.

FIG. 11 is a block diagram that illustrates functions realized by the cooperation of the hardware of the CPU 50 and software stored in the ROM 52 or the like in the controller 24 of the KVM switch 20 configured according to the second embodiment.

Referring to FIG. 11, the controller 24 is equipped with a determination part 90, a transmission control part 92, a conversion part 94, and a select part 96. The determination part 90 determines an automatic key output function is valid.

The transmission control part 92 repeatedly sends the server 10 BIOS boot key data for booting BIOS of the server at predetermined transmission intervals a predetermined number of times when the server 10 is booted or rebooted. The transmission control part 72 sends data converted by the conversion part 74 to the server 10 or the client 30.

Figure 12:
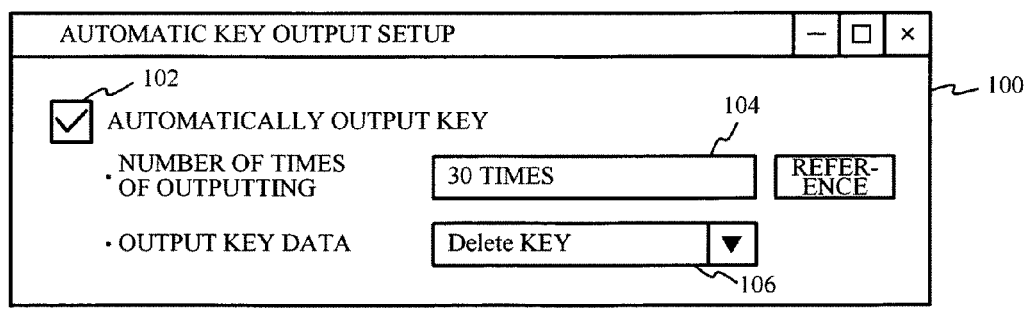
FIG. 12 illustrates an automatic key output setup screen displayed on a client PC.

A description is now given of the setup of BIOS boot key data sent to the server 10 successively. FIG. 12 illustrates an exemplary automatic key output setup screen displayed on the client PC 30. Referring to FIG. 12, an automatic key output setup screen 100 has a check box 102, a select box 104, and another select box 106. The user sets up the BIOS boot key data on the automatic key output setup screen 100 by using the keyboard 30A and the mouse 30B of the client PC 30.

In a state in which the check box 102 for automatic key output is selected, the automatic key output function is validated. The determination part 90 determines whether the automatic key output function is valid by determining whether the check box 102 has been selected.

The number of times of outputting indicates the number of times that the BIOS boot key data is repeatedly sent to the server 10. The transmission control part 92 sends the BIOS boot key data to the server 10 by the number of times specified in the select box 104 associated with the number of times of outputting. The select box 104 may be varied so that successive transmission may be selected. When successive transmission is selected, the transmission control part 92 successively transmits the BIOS boot key data selected through the output data select box 106 to the server 10 until the check box 102 is released from the selected state.

The output key data is the BIOS key data sent to the server 10. The memory 28 stores multiple pieces of BIOS key data, and one piece of BIOS key data may be selected from among them. In the case where the check box 102 is selected, the transmission control part 92 sends the BIOS boot key data selected through the output key data select box 106 to the server 10 when the server 10 is booted or rebooted.

The conversion part 94 converts the screen data and key data into IP packet data and vice versa.

The select part 96 selects one piece of BIOS boot key data from among the multiple pieces of BIOS boot key data stored in the memory 28. The select part 96 sets the number of times that the BIOS boot key data is repeatedly sent to the server 10. The method for setting up the BIOS boot key data and that for selecting the number of times of outputting have been described with reference to FIG. 12.

Figure 13:
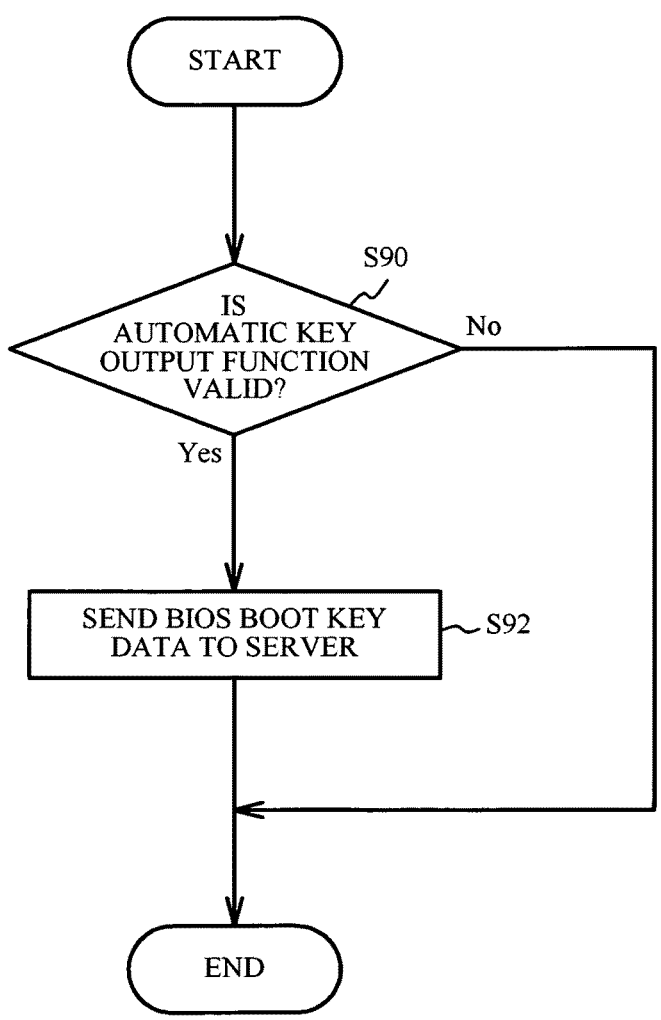
FIG. 13 is a flowchart of a process executed by a KVM switch configured according to the second embodiment.

FIG. 13 is a flowchart of a process executed by the controller 24 of the KVM switch 20. Referring to FIG. 13, the controller 24 determines whether the automatic key output function is valid when the server 10 is booted or rebooted (step S90). When it is determined that the automatic key output function is valid (YES in step S90), the controller 24 sends the server 10 the BIOS boot key data selected from among the pieces of BIOS boot key data stored in the memory 28 at predetermined intervals by a predetermined number of times (step S92). In contrast, when it is determined that the automatic key output function is not valid (NO in step S92), the controller 24 ends the process without sending the BIOS boot key data to the server 10.

According to the second embodiment, the KVM switch 20 successively sends the server 10 the BIOS boot key data for booting BIOS of the server 10 by the desired number of times when the server 10 is booted or rebooted. Thus, the KVM switch 20 may automatically respond to the BIOS boot screen of the server 10.

The automatic key output setup screen 100 illustrated in FIG. 12 may be varied so that the intervals for transmission of BIOS boot key data may be set. The intervals for transmission are not limited to a constant value but may be variable. For example, the intervals for transmission may be set to a relatively large value at the commencement of transmission and may decrease gradually. The second embodiment is not limited to the case where the key data for booting BIOS but may be configured to transmit another key data such as key data for activating the boot menu.

Advantages similar to those of the first and second embodiments may be obtained in such a manner that a recording medium in which software for realizing the functions of the KVM switch 20 is connected to the KVM switch 20 and the CPU of the KVM switch 20 reads and executes the programs stored in the recording medium. The recording medium may be a CD-ROM, DVD, SD card and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A KVM switch connected between an information processing device and a remote terminal, comprising:
    a memory part that stores boot screen data that is image data of the boot screen generated by the information processing device and to be displayed when the information processing device is booted or rebooted; and
    a transmission control part configured to send predetermined key data to the information processing device independently of the remote terminal when screen data that is image data received from the information processing device coincides with the boot screen data stored in the memory part.

2. The KVM switch according to claim 1, wherein:
    the memory part stores multiple pieces of boot screen data;
    the KVM switch further comprises a select part configured to select one piece of boot screen data from among the multiple pieces of boot screen data; and
    the transmission control part sends the predetermined key data to the information processing device when the screen data received from the information processing device coincides with the one piece of boot screen data selected by the select part.

3. The KVM switch according to claim 1, further comprising a memory control part that causes the memory part to store data of a screen captured from among screens displayed on the remote terminal as the boot screen data.

4. The KVM switch according to claim 1, wherein:
    the boot screen data stored in the memory part includes data for booting BIOS of the information processing device; and
    the predetermined key data sent by the transmission control part includes data that boots the BIOS of the information processing device.

5. The KVM switch according to claim 1, wherein the KVM switch and the remote terminal are connected via a network.

6. The KVM switch according to claim 5, where data is transmitted from the KVM switch to the remote terminal in the form of IP packet data converted from KVM data.

7. A KVM system comprising:
    an information processing device;
    a KVM switch that is connected to the information processing device and sends predetermined key data to the information processing device when screen data that is image data received from the information processing device coincides with boot screen data that is image data of the boot screen generated by the information processing device and to be displayed and stored in a memory part when the information processing device is booted or rebooted; and
    a remote terminal that is connected to the KVM system and is used to operate the information processing device via the KVM switch.

8. A non-transitory computer readable storage medium storing a program causing a computer to execute process for realizing an KVM switch connected between an information processing device and a remote terminal, the process comprising:
    storing, in a memory part, boot screen data that is image data of the boot screen generated by the information processing device and to be displayed when the information processing device is booted or rebooted; and
    sending predetermined key data to the information processing device independently of the remote terminal when screen data that is image data received from the information processing device coincides with the boot screen data stored in the memory part.

9. A KVM switch connected to an information processing device and a remote terminal, comprising:
    a memory part that stores predetermined key data; and
    a transmission control part that repeatedly sends the predetermined key data that is one key data to the information processing device by a predetermined number of times after the information processing device is booted or rebooted.

10. The KVM switch according to claim 9, wherein the predetermined key data sent by the transmission control part includes key data that boots BIOS of the information processing device.

11. A KVM system an information processing device;
    a KVM switch that is connected to the information processing device and repeatedly sends predetermined key data that is one key data to the information processing device by a predetermined number of times after the information processing device is booted or rebooted; and
    a remote terminal that is connected to the KVM system and is used to operate the information processing device via the KVM switch.

12. A non-transitory computer readable storage medium storing a program causing a computer to execute process for realizing an KVM switch connected between an information processing device and a remote terminal, the process comprising:

storing, in a memory part, predetermined key data; and repeatedly sending the predetermined key data that is one key data to the information processing device by a predetermined number of times after the information processing device is booted or rebooted.

\* \* \* \* \*